J. WILLIAMS.
PIPE COUPLING.
APPLICATION FILED JAN. 21, 1920.
1,401,847.
Patented Dec. 27, 1921.
2 SHEETS—SHEET 1.
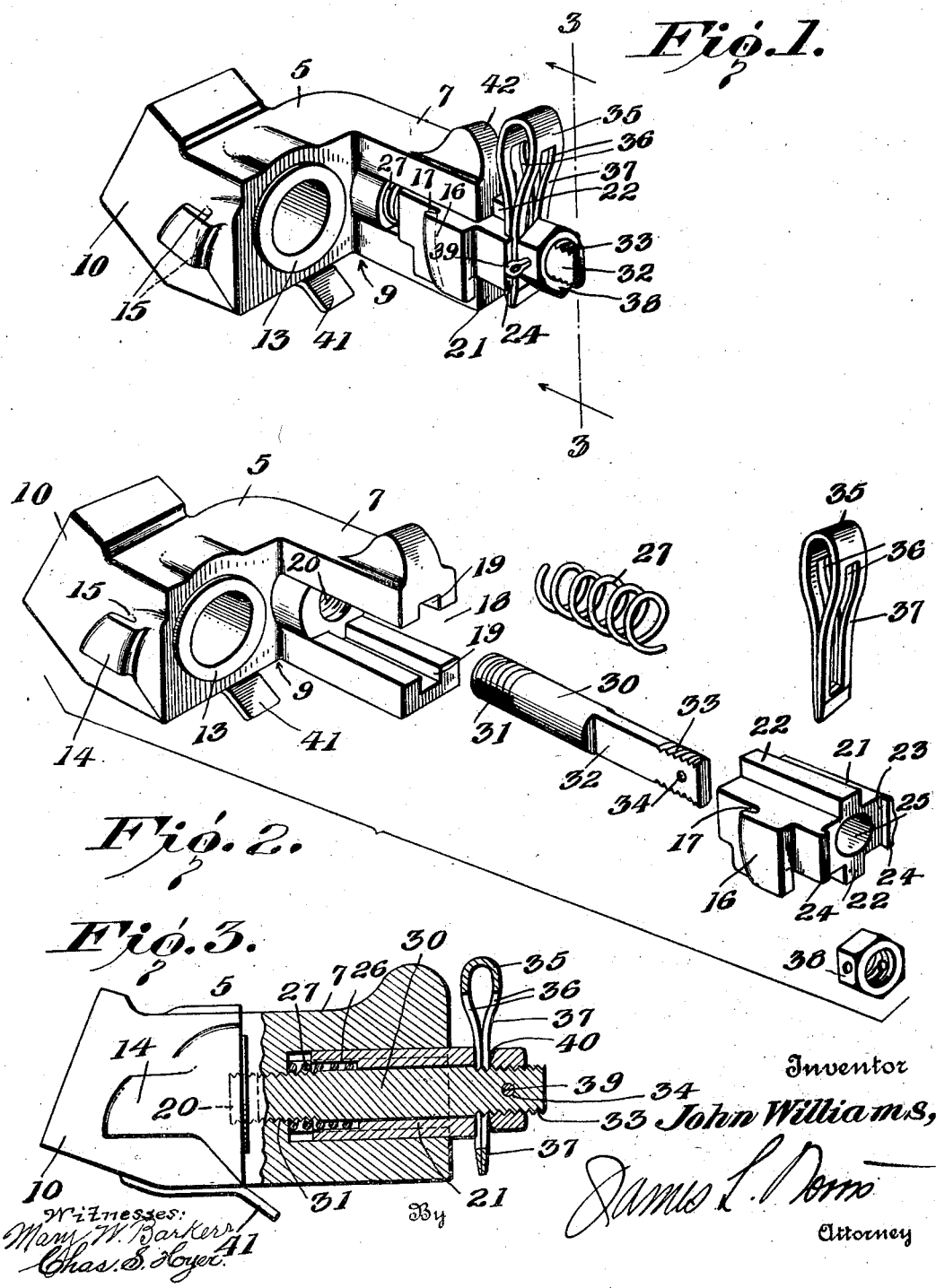

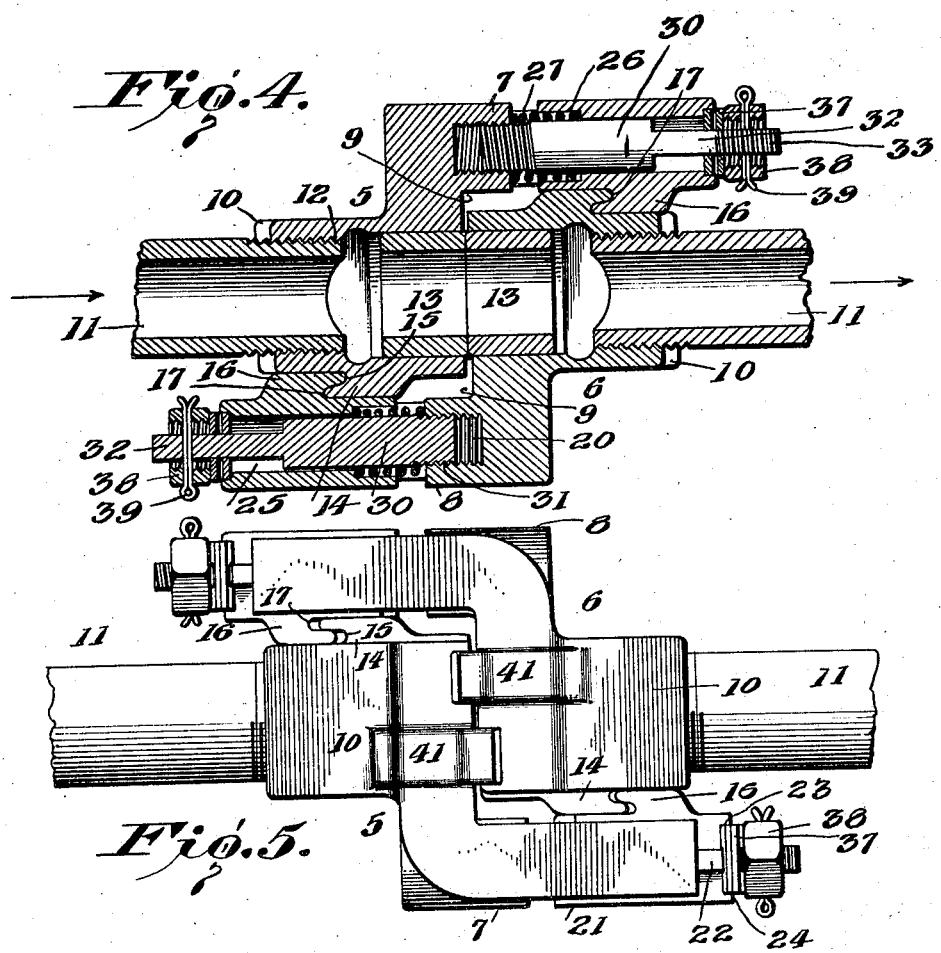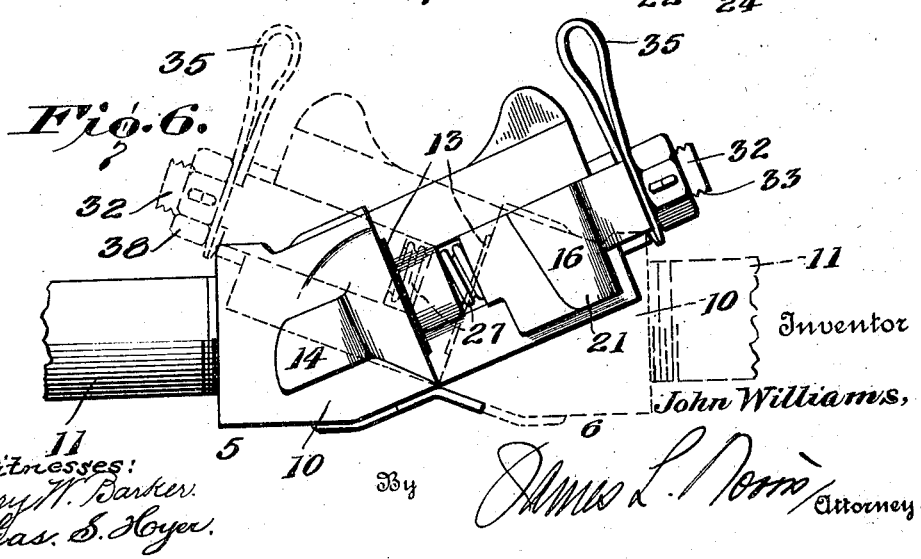

UNITED STATES PATENT OFFICE.

JOHN WILLIAMS, OF CLINTON, IOWA, ASSIGNOR TO WILLIAMS DEVICES COMPANY, OF WILMINGTON, DELAWARE, A CORPORATION OF DELAWARE.

PIPE-COUPLING.

1,401,847.  Specification of Letters Patent.  Patented Dec. 27, 1921.

Application filed January 21, 1920. Serial No. 352,977.

*To all whom it may concern:*

Be it known that I, JOHN WILLIAMS, a citizen of the United States, residing at Clinton, in the county of Clinton and State of Iowa, have invented new and useful Improvements in Pipe-Couplings, of which the following is a specification.

This invention relates to train pipe couplings, and comprises a device of the class or character indicated having certain improved features which render it especially applicable for installation as a part of the system of hose pipe or pipe sections in general use on railway passenger coaches or cars to supply steam heat from one coach to another. The improved coupling may be applied to pipes generally, particularly where a conveniently operable means is necessary for quickly connecting and disconnecting pipe sections or lengths.

The improved coupling or coupling head embodies the standardized construction of the devices of this class and is interchangeable relatively to steam pipe coupling heads now in use without requiring structural reorganization of the usual coupling equipment of coaches, and also capable of practical or working assemblage with the present adopted form of steam pipe and other analogous coupling heads.

The improved coupling or coupling head in its preferred application is attached to the terminal of a hose or pipe section located at a coach or car end, and the coupling heads at the confronting ends of a pair of hose or pipe sections are equipped with gaskets as usual, but these gaskets instead of having leaking crevices between them when the heads are assembled or coupled are constantly maintained in a steam-tight relation by being pressed forcibly toward each other through the medium of means readily operable to effect a tight engagement of the gaskets, or, at times to relax the requisite normal tight engagement of the gaskets for the purpose of allowing water of condensation to run out or escape between the heads, and thereby provide for internal drainage with material advantages in the conveyance of steam through the type of heads and pipes specified. The improvement also embodies means for adjusting the same to compensate for shrinkage of the gaskets and wear on the coupling parts and whereby the durability and practical service of coupling heads of this character are rendered far more durable than is the case with the form of coupling head now commonly used. Consequently, the danger to which both trainmen and passengers are ordinarily subjected for example, the inability of either an engineer or conductor and passengers to see the station platform by reason of steam escaping from the steam pipe couplings particularly when the wind is in the proper direction either in stopping or stepping off a train, and the liability of train hands to become scalded during the operation of coupling and uncoupling coaches or cars, as well as the extra strain upon an engine and waste of steam and fuel, are entirely eliminated. A further important feature of the improvement is the duplication of structure of the several parts of each head to render said parts readily replaceable when excessive wear requires a removal of one part and substitution therefor of another similar part.

The invention also contemplates the preferred specific structure which will be more fully hereinafter described and claimed.

In the accompanying drawings a preferred form of the invention is shown, and therein:

Figure 1 is a perspective view of a coupling head illustrating the features of the invention.

Fig. 2 is a perspective view showing the parts separated.

Fig. 3 is a side elevation of the head partially in section, the section being taken in the plane of the line 3, 3, Fig. 1.

Fig. 4 is a horizontal section of two of the heads shown in coupled association.

Fig. 5 is a bottom plan view of two heads in coupled association.

Fig. 6 is a side elevation of two heads shown in full and dotted lines and illustrating the positions of the heads during the coupling operation.

The preferred form of coupler as shown comprises two heads 5 and 6 which are exact counterparts in construction, and respectively have longitudinally extending arms 7 and 8 which project in opposite directions when the heads are assembled for coupling. The arms 7 and 8 project a considerable distance beyond the coupling ends or faces of the heads and provide with the latter right angular recesses 9 of exactly the same dimensions so that a flush or accurate fitting of the parts of the two heads and a position registration and interlock of the connecting means easily effected.

Each coupling head has an upturned nozzle 10 for connecting thereto the usual hose or pipe section 11 as shown by Fig. 4, and each head has a central bore 12 extending regularly through its nozzle and the coupling end or face thereof. Within the bore 12 adjacent to and slightly projecting beyond the coupling end or face a suitable gasket 13 is mounted, the confronting edges of the two gaskets 13 being closely engaged or abutting when the coupling heads are associated in coupling position to form a tight joint between the heads and a continuous passage through the latter.

At an intermediate point at one side of each head a locking member or lug 14 is provided and preferably integrally formed with the head, said member or lug 14 having a curved or segmental rearwardly opening groove 15 which operates and is adapted to interlock with a similar locking member or lug 16 on the inner side of each arm 7 and 8. The locking member or lug 16 is also provided with a rearwardly opening segmental groove 17, the two members or lugs 14 and 16 of each head and the adjacent arm having a snug but readily separable relative fit.

Each arm 7 or 8, in addition to its contributory operation as a coupling means through the medium of the member or lug 16, serves as a guide, and has a slot 18 extending partially lengthwise and opens through opposite sides thereof. The upper and lower walls of the slot 18 have central longitudinal seat grooves 19 formed therein. In the center of the end of the wall of the slot 18 and continuing longitudinal into the adjacent body of the head is a threaded opening 20 which forms a socket for adjusting purposes hereinafter explained. In each slotted arm 7 or 8, a slide block or adjusting member 21 is mounted and has the member or lug 16 on the inner side thereof, the upper and lower sides of the said block or member having longitudinal ribs 22 to fit and move in the respective grooves 19. The front end of the block or member 21 also has a guide recess 23 vertically therethrough and provided with side flanges 24. Through the longitudinal center of the block or member 21 a smooth bore 25 is formed and has its rear portion diametrically enlarged to provide a seat 26 for the front terminal of a spring 27, the rear terminal of said spring bearing against the rear end wall of the slot 18. An adjusting pin 30 loosely extends through the bore 25 of the block or member 21 and also through the spring 27, and has a rear screw threaded end 31, to fit in the socket 20 and an outer flat shank 32 with screw threads 33 at the upper and lower edges, and a transverse opening 34 through the front extremity. Over the flat shank 32 of the pin 30, a resilient wedge element 35 is applied, said element consisting preferably of a doubled flat spring having slots 36 in the adjacent members 37 to permit said element to be loosely applied over and vertically adjustable with relation to the shank 32. The rear slotted member of the element or spring 35 fits and is vertically movable in the guide recess 23, and on the threads 33 a nut 38 is adjustably fitted and held against movement after adjustment by a cotter pin or analogous device 39. The inner side 40 of the nut is convex or has a curved bevel to reduce the bearing or engaging contact thereof with the outer member 37 of the resilient wedge element or spring 35 to minimize the friction on the spring. Extending forwardly from the bottom of each head 5 is a downwardly inclined coupling guide 41 disposed to one side of the vertical center of the head, or, nearer the arm 7 or 8 than the opposite sides of the heads, and whereby when the two heads are brought into operating position the respective guide arms 41 bear against the opposing bottom portions of the two heads as shown by Fig. 5 and enable the operator with ease and facility to bring the members or lugs 14 and 16 into engaging positions and effect a positive end engagement of the gaskets 13.

As an incidental strengthening feature the upper portion of each arm 7 or 8 is formed with an enlargement 42 adjacent to each wedge element or spring 35 for the purpose of receiving the impact of a trainman's hammer when tightening the wedges in the event that the hammer impact is carelessly applied.

In other parts of each head where found necessary sufficient metal will be provided to render the head strong and durable and to resist the usual fracturing influences affecting this type of head.

The foregoing specific construction of parts has been found materially advantageous in the application of the improved coupling head in accordance with the features of the invention, and it will be observed that the number of parts embodied in each head is comparatively few and may be readily separated and replaced. It will be understood, however, that the invention as embodied in the improved coupling head is not limited to the precise structural features hereinbefore explained. The most essential feature from a broad aspect of the invention, is a coupling head with a gasket and a coupling member or lug on one side and an opposing adjustable or slidable member or lug at the opposite side or portion of the head and resilient means coöperating with the slidable or adjustable coupling member or lug for maintaining a tight engaging pressure between the conterminal ends of the gaskets of two similar heads to adjust or compensate for wear on the parts and especially the coupling members or lugs 14 and 16. It is therefore the intention of the present invention to also be understood in its broadest aspect to provide each head with one movable coupling member or lug capable of being adjusted to take up wear and disposed to engage a fixed or rigidly positioned coupling member or lug on a part of an adjacent head irrespective of the means used for adjusting the movable member carrying the coupling member or lug. It is preferred, however, to use a resilient wedge or spring hereinbefore explained because the latter device has been found to be more satisfactory in its practical operation and for the further reason that it can not become accidentally detached from the head or arm of the latter and lost.

The structure of each head and its components is identical, thereby materially saving in the cost of manufacture and assemblage of the several parts. Moreover the gaskets 13 may be replaced with very little expense and trouble.

From a still further aspect of the present invention the arms 7 and 8 of the respective heads serve as locking arms carrying automatically movable and adjustable contributory locking means or elements to cooperate with rigid locking means or elements on the sides of the heads adjacent to said arms. These arms 7 and 8 also act as guards in opposition with respect to the coupled heads and as guides during the coupling operation of the heads. Furthermore, by means of the improved construction as hereinbefore explained wearing friction on the two coupling elements of each adjacent head side and arm is materially reduced in the act of coupling the two heads together and also when the coupling elements or members engage, owing to the resiliently controlled movable coupling element or member, and this reduction of friction correspondingly decreases the wear of the coupled elements or members and at the same time the ends of the gaskets 13 are held together in a steam tight association or contact with a yielding pressure engagement which will also tend to reduce the wear on the gasket ends without in the least detracting from the effectiveness of the gaskets in the formation of a steam tight joint when the said gasket ends are in normal engaging relation.

From the foregoing description the operations of coupling and uncoupling the heads will be readily understood. In coupling the heads the resilient wedges or springs 35 are first loosened or drawn upwardly and the heads are then arranged at upward reverse angles of inclination with the coupling guides 41 loosely bearing against the bottoms of the heads as hereinbefore explained, and by downward pressure on the outer ends of the heads to straighten out the same the coupling members or lugs 14 and 16 are caused to have a relative riding action and the ends of the gaskets 13 are firmly engaged. After the heads are straightened out in coupled relation the resilient wedges or springs 35 are driven downwardly the requisite degree by pressure or through the medium of a hammer blow applied to the upper end thereof. In uncoupling the heads the resilient wedge members or springs 35 are loosened by drawing upwardly on the same, and then the heads are pressed upwardly to dispose them at such an angle as to permit the separation of the engaging or gasket ends and the coupling members or lugs 14 and 16, and when this disengagement ensues the heads may be readily separated. As herein before indicated the two heads may remain in coupled relation and a drainage crevice provided between the abutting ends of the gaskets 13 by loosening the resilient wedge members or springs 35. The resilient wedge members or springs 35 may be set in the adjusted position desired, and thereafter the heads may be coupled and uncoupled by varying the relative angular position of the heads without in the least modifying or changing the adjustment of the said springs. In other words, the heads may be coupled and uncoupled by swinging them in a vertical plane; and one advantage of this particular coupling and uncoupling operation of the heads is that the heads may be automatically uncoupled in the event that the train separates.

What is claimed is:

1. In a coupling of the class specified, the combination of a pair of tubular heads having coupling units in reverse positions on the outer sides thereof, a pair of gaskets carried by said heads with their outer edges in abutting relation, and rigid coupling members in reverse positions at opposite sides of the heads and provided with longitudinally movable resiliently controlled coupling devices therein clear of the heads and having units to engage the head units and turn on the latter.

2. In a coupling of the class specified, the combination of a pair of tubular heads having coupling units in reverse positions on the outer sides thereof at a distance rearwardly from the free ends of the heads, a pair of gaskets carried by said heads with their outer edges in abutting relation; and coupling members rigidly carried by adjacent portions of opposite sides of the heads and provided with longitudinally movable resiliently controlled coupling devices therein having coupling units to interlock with and turn on the coupling units of the heads, the coupling devices operating to regulate the pressure of the gasket edges and permit an opening to be formed between said latter edges for draining purposes.

3. In a coupling of the class specified, the combination of a pair of tubular coupling heads, a pair of gaskets carried by said heads with their outer edges in abutting relation, and coupling means in reverse positions at opposite sides of the heads for holding the said heads in assembled relation and causing the edges of the gaskets to engage, a part of said means being automatically movable and having adjustable wedges therein for regulating the engagement of the gasket edges.

4. In a coupling device of the class specified, the combination of a pair of tubular coupling heads having gaskets projecting therefrom for end edge engagement and also provided with rigid coupling units on the outer sides thereof, and coupling components comprising arms rigidly connected to the opposite sides of the heads and disposed in reverse positions, said arms having longitudinally movable resiliently controlled devices also arranged to reversely operate and having rigid coupling units to interlock with and turn on the coupling units of the heads.

5. In a coupling of the class specified, the combination of a pair of coupling heads each having a longitudinally disposed rigid coupling arm at one side, the coupling arms of the two heads being in reverse positions and each arm provided with an automatically movable member, the automatically movable member of each coupling arm and each head being provided with rigid interlocking coupling units having relative limited arcuate turning movement one on the other, and adjustable resilient means carried by the arms to control and compensate for the coupling association and movement of the heads as a whole.

6. In a coupling of the class specified, the combination of a pair of coupling heads each having a coupling arm longitudinally projecting at one side thereof, the arm of one head extending in a direction opposite to that of the arm of the other head, and coupling means between and carried by the sides of the head and arms, a part of the said means having an automatic longitudinal movement and the remaining part of said means being rigid or fixed, and resilient wedge members engaging portions of said coupling and operative to vary the engaging pressure between the heads and normally holding the heads in associated relation.

7. Coupling heads of the class specified having interacting rigid coupling means reversely disposed between opposite side portions of the heads, the adjacent sides of the heads and coupling means having shiftable members provided with rigid coupling devices operating to arcuately turn one on the said rigid coupling means on the side portions of the heads, said coupling means having automatically operating resiliently controlled compensating devices clear of the heads.

8. In a coupling of the class specified, the combination of a pair of tubular heads having rigid coupling units in reverse positions on the outer sides of the heads, a pair of gaskets carried by said heads with their outer edges in abutting relation, and rigid coupling arms longitudinally extending along and outwardly from adjacent side portions of the heads and carrying resiliently movable coupling devices with inner rigid coupling units for interlocking movable coöperation with the coupling units of the heads, the rigid coupling units of the movable coupling devices and the coupling units on the sides of the heads being adapted to be unlocked by causing the heads to change their relative angular positions.

9. In a coupling of the class specified, the combination of a pair of coupling heads each having a coupling arm longitudinally projecting at one side thereof, the arms of the respective heads extending in reverse directions, spring controlled slide members mounted in the arms, the slide members and adjacent portions of the heads having interfitting separable coupling means, means for adjusting the slide members, and resilient wedge members movably engaging portions of the slide members and controlling the pressure of the heads.

10. In a coupling of the class specified, the combination of a pair of tubular heads, a pair of gaskets carried by said heads with their outer edges in abutting relation, and coupling members rigidly carried by opposite adjacent side portions of the heads and in reverse positions, portions of the coupling members having resiliently movable adjusting means for regulating the pressure of the gasket edges and permitting an opening to be formed between the said edges for draining purposes, said coupling members being adapted to be unlocked by causing the heads to change their relative angular positions.

11. In a coupling of the class specified, the combination of a pair of tubular coupling heads, a pair of gaskets carried by said heads with their outer edges in abutting relation, and coupling means disposed at opposite sides of the heads in reverse positions for holding the said heads in assembled relation and causing the edges of the gaskets to engage, the coupling means in the main being rigidly associated with the heads and having in part automatically movable and adjustable means for regulating the engagement of the gasket edges, said coupling heads adapted to be unlocked by causing the heads to change their relative angular positions.

12. Coupling heads of the class specified, having reversely arranged interacting coupling means at opposite side portions thereof and in the main rigidly associated with the heads, parts of the said coupling means having longitudinally movable compensating devices, and means adjustably engaging said compensating devices to regulate the movable relation of the coupling heads, the coupling means being adapted to be unlocked by causing the heads to change their relative angular positions.

13. Coupling heads of the class specified having interacting separable coupling means between adjacent portions thereof and in part provided with resiliently controlled longitudinally movable devices disposed at opposite sides of the heads, and means for adjusting portions of said coupling means to compensate for wear and regulate the engagement and coupling pressure of the heads, the separable coupling means being adapted to be unlocked by causing the heads to change their relative angular positions.

14. Coupling heads of the class specified, having interacting coupling means in the main rigidly associated with the heads and disposed between adjacent portions of opposite sides of said heads, said coupling means in part carrying automatically longitudinally movable elements reversely coacting with the heads, and resilient devices engaging portions of the said elements for regulating the engagement and coupling pressure of the heads, said coupling means being adapted to be unlocked by causing the heads to change their relative angular positions.

15. In a coupling of the class specified, the combination of a pair of tubular heads having coupling members carried by adjacent portions of opposite sides of the heads, a part of the coupling members being in the form of arms having guides with adjusting slide members mounted therein and adjusting pins engaging the said members, adjusting means on the outer ends of said pins and adjustable spring wedges fitted over the pins between the adjusting means and the adjacent ends of the slide members, and a pair of gaskets carried by said heads.

16. In a coupling of the class specified, the combination of a pair of tubular heads, a pair of gaskets carried by said heads with their outer edges in abutting relation, coupling members carried by adjacent portions of the opposite sides of the heads, a part of the coupling members being rigid and the remaining portion being held by arms standing outwardly from the heads and having guides formed therein to receive spring actuated adjusting slides and adjusting pins extending through the slides, adjusting devices on the outer ends of the pins, and adjustable spring wedges fitted over the pins between the adjusting devices and the adjacent ends of the slides.

17. In a coupling of the class specified, the combination of a pair of tubular heads having gaskets carried by the outer abutting edges thereof and rigid coupling units on opposite sides, and coupling members on the sides of the heads opposite the sides of the latter carrying the coupling units, the coupling members having automatically movable coupling units to engage the units on the adjacent sides of the heads, the heads being arranged to be unlocked solely by disposing them in relative angular positions.

18. In a coupling of the class specified, the combination of a pair of tubular heads having gaskets carried by the outer abutting edges thereof and each head having a rigid coupling unit on one side and a rigid coupling member on the opposite side with an automatically operating coupling unit to engage the coupling unit on the adjacent head side whereby the heads are arranged to be unlocked solely by disposing them in relative angular positions.

In testimony whereof I have hereunto set my hand in presence of a subscribing witness.

JOHN WILLIAMS.

Witness:
CHAS. S. HYER.